United States Patent [19]

Hsieh et al.

[11] 4,432,035

[45] Feb. 14, 1984

[54] METHOD OF MAKING HIGH DIELECTRIC CONSTANT INSULATORS AND CAPACITORS USING SAME

[75] Inventors: Ning Hsieh, San Jose, Calif.; Eugene A. Irene, Hopewell Junction, N.Y.; Mousa H. Ishaq, Essex Junction; Stanley Roberts, South Burlington, both of Vt.

[73] Assignee: International Business Machines Corp., Armonk, N.Y.

[21] Appl. No.: 387,315

[22] Filed: Jun. 11, 1982

[51] Int. Cl.$^3$ .................. H01G 4/10; H01G 4/06; B05D 5/12
[52] U.S. Cl. .................. 361/322; 361/313; 427/79
[58] Field of Search .......... 361/311, 321, 322, 312, 361/313; 427/79, 82, 86, 88, 96

[56] References Cited

U.S. PATENT DOCUMENTS

| | | | |
|---|---|---|---|
| 2,693,629 | 11/1954 | Denes | 361/321 X |
| 3,819,990 | 6/1974 | Hayashi et al. | 361/313 |
| 4,062,749 | 12/1977 | Young | 361/313 X |
| 4,227,944 | 10/1980 | Brown et al. | 148/6 |

FOREIGN PATENT DOCUMENTS

| | | | |
|---|---|---|---|
| 52-58855 | 5/1977 | Japan | 361/322 |
| 56-35013 | 8/1981 | Japan | 427/79 |

OTHER PUBLICATIONS

K. Ohta et al., "A Stacked High Capacitor RAM", 1980 *IEEE International Solid-State Circuits Conference*, pp. 66–67.

S. Zirinsky et al., "Oxidation Mechanisms in WSi$_2$ Thin Films", *Applied Physics Letters*, 33(1), Jul. 1, 1978, pp. 76–78.

*Primary Examiner*—Donald A. Griffin
*Attorney, Agent, or Firm*—Stephen J. Limanek

[57] ABSTRACT

An improved method of fabricating a stable high dielectric constant and low leakage dielectric material includes oxidizing at a temperature of about 400° C. or higher a layer of a transition metal-silicon alloy having 40% to 90% transition metal by atomic weight to produce a silicate or homogeneous mixture. The mixture includes an oxide of the transition metal and silicon dioxide. The alloy may be deposited on, e.g., a semiconductor or an electrically conductive layer that is oxidation resistant, and the thickness of the mixture or oxidized alloy should be within the range of 5 to 50 nanometers. By depositing an electrically conductive layer on the homogeneous mixture, a capacitor having a high dielectric, low leakage dielectric medium is provided.

24 Claims, 8 Drawing Figures

METHOD OF MAKING HIGH DIELECTRIC CONSTANT INSULATORS AND CAPACITORS USING SAME

DESCRIPTION

1. Technical Field

This invention relates to a method of fabricating high dielectric constant insulators, particularly a dielectric material having a high quality index for use in the integrated semiconductor circuit technology, and to capacitors using same.

2. Background Art

For very dense integrated semiconductor circuits, such as known dynamic field effect and bipolar transistor memory circuits, small high capacitance storage nodes are necessary to relax design requirements for driver, refresh and sense circuits.

Although silicon dioxide is successfully and commonly used as the dielectric material in storage capacitors or nodes, consideration has been given to the use of very thin thermal silicon nitride and high dielectric constant transition metal oxides, such as tantalum oxide ($Ta_2O_5$) and hafnium oxide ($HFO_2$) for providing improved storage capacitors. It has been found that the thermal nitride is difficult to prepare at temperatures below 1050° C. and requires a very low dew point nitrogen furnace atmosphere. The transition metal oxides are difficult to prepare sufficiently thin to provide the desired combination of high capacitance, low electrical leakage and substantial voltage breakdown strength, and they are generally not stable at high temperatures. The transition metal oxides must be fabricated at low temperatures to suppress recrystallization, which causes significantly higher electrical leakage. Transition metal oxides are discussed in an article entitled, "A Stacked High Capacitor RAM", by O. Kuniichi, et al, IEEE International Solid State Circuits Conference, February 1980, pp. 66–67. It should be understood that transition metals are metals that have unfilled outer electron valence shells which generally are at D and P energy levels of the atomic structure.

It is also known to produce insulating layers by oxidizing metal silicides, such as tungsten silicide ($WSi_2$) and molybdenum silicide ($MoSi_2$) to form protective layers of silicon dioxide, either as an insulator disposed between electrically conductive lines or as a passivating layer. Oxidation of $WSi_2$ deposited on a silicon or polysilicon substrate to form a protective overlayer of silicon dioxide is taught in, e.g., an article entitled "Oxidation Mechanism in $WSi_2$ Thin Films", by S. Zirinsky, W. Hammer, F. d'Heurle and J. Baglin, in Applied Physics Letters 33(1), July 1, 1978. Oxidation of $MoSi_2$ deposited on molybdenum to form a protective overlayer of silicon dioxide is taught in U.S. Pat. No. 4,227,944, filed by D. M. Brown et al on June 11, 1979. The silicon dioxide produced by oxidizing these metal silicides has all the known dielectric properties and characteristics of silicon dioxide including a dielectric constant of 3.9 but a higher current leakage than exhibited by thermally grown silicon dioxide from a single crystal silicon substrate.

DISCLOSURE OF THE INVENTION

It is an object of this invention to provide a simple process for making an insulating material having a substantially higher dielectric constant than that of silicon dioxide and low current leakage characteristics, which is chemically stable within a wide range of temperatures, i.e., between about −150° C. and +1300° C. It is another object of this invention to provide an improved storage capacitor which includes a dielectric medium having a high dielectric constant produced by the process of this invention.

In accordance with the teachings of this invention, an improved method of fabricating a stable high dielectric constant and low leakage dielectric material includes oxidizing a layer of a transition metal-silicon alloy having 40% to 90% by atomic volume of the transition metal. This alloy may be deposited on an electrically conductive layer or on an insulating layer that is oxidation resistant and the thickness of the oxidized alloy should be within the range of 5 to 50 nanometers. The oxidation of this alloy at temperatures of about 400° C. or higher for several minutes or up to one hour or longer produces a high dielectric, low leakage insulator which includes a silicate or mixture having a transition metal oxide and silicon dioxide. By depositing a conductive layer over the silicate, an improved high capacitance capacitor may be formed.

The foregoing and other objects, features and advantages of the invention will be apparent from the following and more particular description of the preferred embodiments of the invention, as illustrated in the accompanying drawings.

BEST MODE FOR CARRYING OUT THE INVENTION

Figure 1:
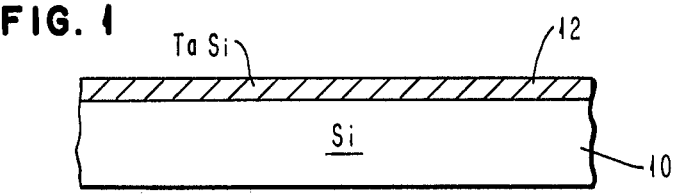
FIG. 1 illustrates in sectional view a layer of transition metal-silicon alloy having a high concentration of transition metal formed on a semiconductor substrate prior to oxidation.
Figure 2:
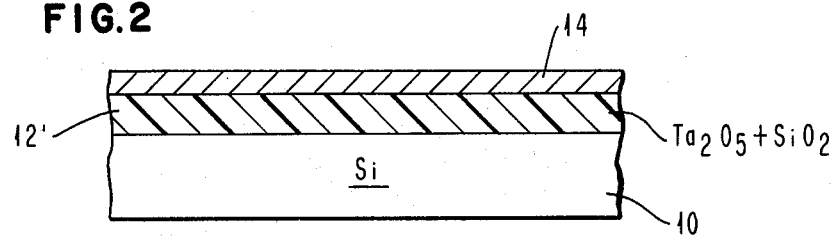
FIG. 2 illustrates a sectional view similar to that of FIG. 1 but taken after the alloy has been oxidized and with a capacitor electrode or plate deposited thereon.

Referring to FIG. 1 of the drawings in more detail, there is illustrated in sectional view a semiconductor substrate or wafer 10 made of silicon with a layer of tantalum silicide 12 deposited on the substrate 10. The tantalum silicide may be conveniently deposited in a vacuum onto the substrate 10 by evaporating both tantalum and silicon with known dual electron beam techniques. Additionally, the alloy may be produced by well known sputter deposition techniques. The tantalum silicide layer 12 may, preferably, have a thickness of about 4 to 16 nanometers. After the alloy, tantalum silicide, forming layer 12 of FIG. 1 has been deposited, the alloy is oxidized, preferably in dry oxygen, at a temperature of about 400° C. or higher for several minutes or more until all of the alloy is converted into a silicate layer 12' which includes a mixture of tantalum oxide ($Ta_2O_5$) and silicon dioxide ($SiO_2$), as indicated in FIG. 2 of the drawings. The layer 12' may be patterned with any suitable etching technique to form any desirable design, such as dielectric segments for storage capacitors. The etching technique may be any dry or wet etching technique that is normally used for etching silicon dioxide. A conductive layer 14 made of, e.g., doped polysilicon, a metallic silicide or a metal, is deposited on the oxide mixture layer 12' to form a capacitor having electrodes or plates 10 and 14 with the dielectric medium 12'. The capacitor illustrated in FIG. 2 of the drawings made in accordance with the teachings of the simple process of this invention has a dielectric medium 12' having a dielectric constant which is 3 to 4 times greater than that of silicon dioxide and with current leakage nearly as low as that of silicon dioxide. Furthermore, the dielectric medium 12' can withstand temperatures of 1000° C. and higher for long periods of time without adversely affecting its quality index.

A capacitor having the characteristics indicated hereinabove is particularly useful in semiconductor integrated circuits such as storage capacitors or nodes in very dense memory systems since a storage capacitor of a given dimension provides a stronger signal with a dielectric medium having a higher dielectric constant.

Although the layer 12 in FIG. 1 of the drawings has been identified as being made of tantalum silicide, it should be understood that other transition metal silicides, such as those made of hafnium (HF), zirconium (Zr), lanthanum (La), yttrium (Y), scandium (Sc), niobium (Nb) and vanadium (V), may also be used. Preferred transition metal silicides in addition to tantalum silicide, are hafnium silicide HfSi which after oxidation produces mixture layer 12' including hafnium dioxide ($HfO_2$) and silicon dioxide ($SiO_2$), and yttrium silicide YSi which after oxidation produces mixture layer 12' including yttrium dioxide ($YO_2$) and silicon dioxide ($SiO_2$). It should also be understood that the layer 12 in FIG. 1 may include any transition metal-silicon alloy having about 40% to 90% transition metal by atomic volume so that layer 12' forms a mixture which includes an oxide of the transition metal and an oxide of the silicon.

As is known, silicon dioxide has a dielectric constant of 3.9, whereas oxides of transition metals such as tantalum have a dielectric constant of about 30. However, tantalum oxide has a leakage which is about 100,000 times that of silicon dioxide and, furthermore, tantalum oxide cannot withstand temperatures higher than 400° C. to 500° C. without adversely affecting its quality index. Accordingly, when tantalum oxide is used in semiconductor integrated circuits, it must be formed late in the integrated circuit process after all hot process steps have been performed.

By using the process of the present invention to produce dielectric materials, the current leakage at a 5 volt applied bias is considerably decreased over that found in dielectric material using transition-metal oxide alone, since the current leakage decreases exponentially from about $10^{-4}$ to $10^{-8}$ amperes per square centimeter as the content of silicon dioxide in the mixture layer 12' of FIG. 2 increases from 0% to 100%, while the dielectric constant of the mixture layer 12' decreases only linearly from about 30 to 3.9 as the content of the silicon dioxide in the mixture layer 12' of FIG. 2 increases from 0% to 100%.

Table I, set forth hereinbelow, indicates some of the electrical properties of mixture layer 12' made of tantalum oxide ($Ta_2O_5$) and silicon dioxide ($SiO_2$) when tantalum silicide ($Ta_9Si_2$) is oxidized as described hereinabove and of hafnium dioxide ($HfO_2$) and silicon dioxide ($SiO_2$) when hafnium silicide ($Hf_4Si$) is similarly oxidized, with conductive layer 14 of FIG. 2 being a 0.075 centimeter dot made of molybdenum and layer 10 being made of silicon.

TABLE I

|  | $Ta_9Si_2$ | $Hf_4Si$ |
| --- | --- | --- |
| As-deposited Thickness (nm) | 43.7 | 50.0 |
| Converted Silicate Thickness (nm) | 124.0 | 75.0 |
| Capacitance (pf) | 690 | 620 |
| Dielectric Constant K | 22 | 12 |
| Leakage Volts at $2 \times 10^{-8}$ amp/cm$^2$ | 6.0 | 6.5 |

It can be seen that after oxidation the thickness of the mixture or silicate 12' of FIG. 2 increases up to two to three times that of the thickness of the silicide layer 12 of FIG. 1. These samples were slowly inserted into an oxygen atmosphere at 1000° C. and baked for approximately one hour.

Figure 3:
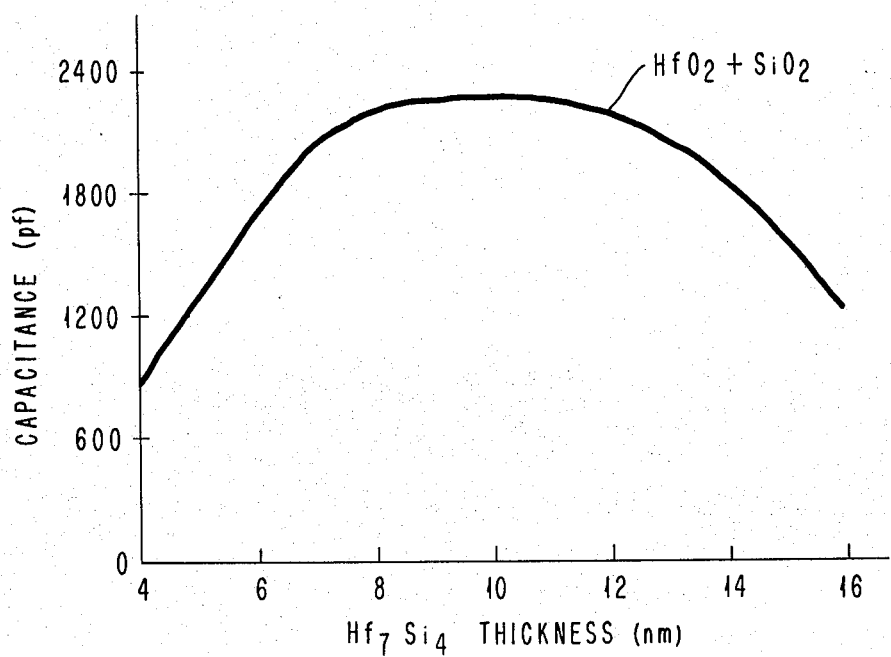
FIG. 3 is a graph indicating the relationship between the capacitance of a capacitor of the type illustrated in FIG. 2 and the initial thickness of the alloy used to form that capacitor.

The graph in FIG. 3 of the drawings indicates the capacitance variations of a 0.075 cm dot of the type illustrated in FIG. 2 of the drawings as a function of initial thickness of hafnium silicide ($Hf_7Si_4$). It can be seen that at an initial silicide thickness of 4 nanometers the capacitor has a capacitance of approximately 900 picofarads and increases rather rapidly to approximately 2100 picofarads at an initial silicide thickness of 7 nanometers. Between about 12 and 16 nanometers the capacitance decreases fairly rapidly from a high of over 2200 picofarads to approximately 1200 picofarads. It has been found that the relatively low capacitance produced at 4 nanometers of silicide is due to the formation of a layer of silicon dioxide between the silicon substrate 10 and the hafnium oxide-silicon dioxide mixture layer 12' of FIG. 2 caused by the penetration of the oxygen to the surface of the silicon substrate 10 during oxidation. Of course, the decrease in capacitance between 12 and 16 nanometer thickness of silicide is caused simply by the thickness of the silicate between the capacitor electrodes 10 and 14 of FIG. 2. Thicknesses above 16 nanometers of the silicide continue to exhibit the high dielectric and low leakage properties in the hafnium oxide-silicon dioxide mixture until the thickness of the silicate exceeds about 50 nanometers. At this latter thickness, the dielectric constant remains high, however, micro fissures begin to form in the mixture causing undesirable current leakage. The leakage indicated in FIG. 3 of the drawings is worst case leakage.

Figure 4:
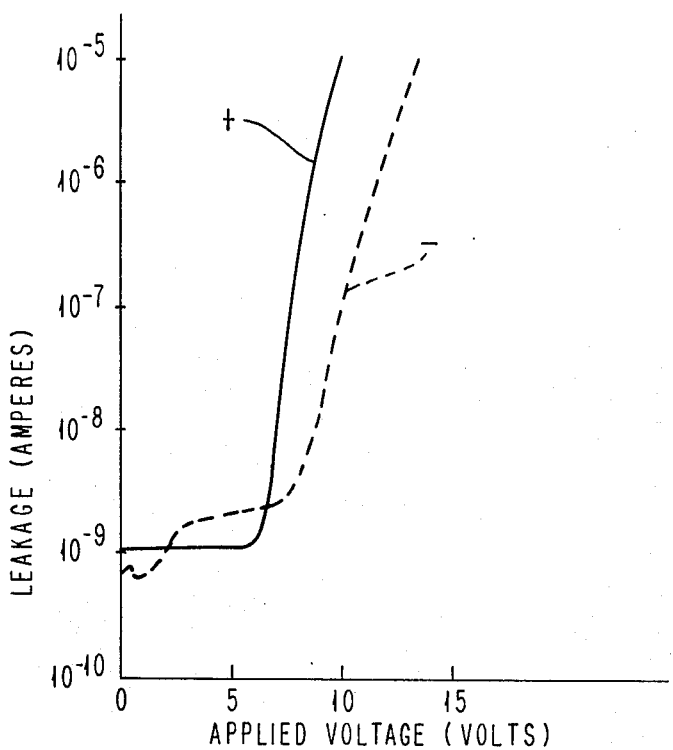
FIG. 4 is a graph indicating the current leakage of a capacitor of the type illustrated in FIG. 2 as a function of applied voltage.

In FIG. 4 of the drawings, there is a graph indicating the relationship between current leakage and applied voltage to a capacitor of the type illustrated in FIG. 2 of the drawings having a titanium dot of 0.075 cm when 15 nanometers of tantalum silicide ($Ta_9Si_2$) deposited on the silicon substrate 10 were oxidized to form 45 nanometers of a tantalum oxide-silicon dioxide mixture 12'. It can be seen that up to about seven volts, i.e., within the range generally used in semiconductor integrated circuit applications, the current leakage is small. The worst case is shown with the silicon substrate 10 being positive (+) with respect to conductive layer 14 of FIG. 2.

Figure 5:
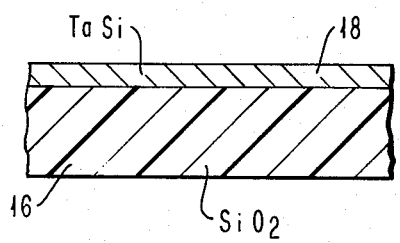
FIG. 5 illustrates in sectional view a layer of transition metal-silicon alloy having a high concentration of transition metal formed on an insulator prior to oxidation.
Figure 6:
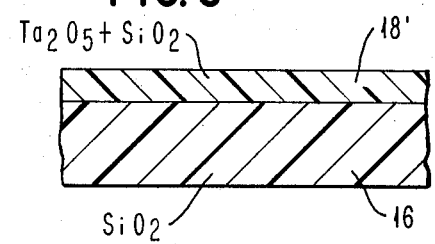
FIG. 6 illustrates a sectional view similar to that of FIG. 5 but taken after the alloy has been oxidized.

Although the substrate 10 in FIGS. 1 and 2 was indicated as being made of silicon, it should be understood that the substrate 10 may also be made of conductive or insulating material as long as the material is oxidation resistant, however, materials suitable for forming a capacitor electrode are preferred. If the silicate is not required on a semiconductor or conductor substrate, an insulating layer 16 conveniently made of silicon dioxide may be used, as indicated in FIG. 5 of the drawings, on which a layer 18 of tantalum silicide (TaSi) has been deposited. By oxidizing the tantalum silicide layer 18 in the manner described hereinabove in connection with the structure illustrated in FIG. 1 of the drawings, the silicide layer 18 is converted into a silicate layer 18' of FIG. 6 having the same tantalum oxide-silicon dioxide mixture indicated in layer 12' of FIG. 2. As with the silicide in layer 12 of FIG. 1, the layer 18 of FIG. 5 has oxygen penetrating therein to convert the tantalum silicide into tantalum oxide and silicon oxide, having electrical properties similar to those described hereinabove in regard to the silicate or mixture of layer 12' of FIG. 2.

Figure 7:
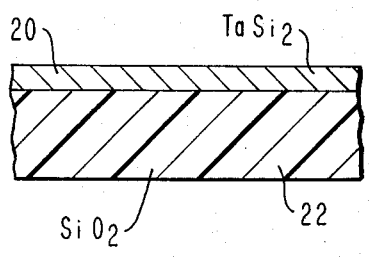
FIG. 7 illustrates, in sectional view, a layer of transition metal-silicon alloy having a concentration of silicon which is substantially higher than that in the alloy illustrated in FIG. 1 formed on an insulator prior to oxidation.
Figure 8:
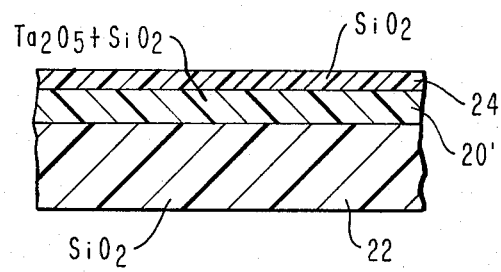
FIG. 8 illustrates a sectional view similar to that of FIG. 7 but taken after the alloy has been oxidized.

To form the transition metal oxide-silicon dioxide silicate or mixture, the silicide which is oxidized should generally contain more transition metal than silicon, although 40% to 90% metal by atomic value has been found to be satisfactory. If a silicide such as tantalum disilicide ($TaSi_2$), which contains substantially more silicon than tantalum, is deposited in the form of a layer 20 on a silicon dioxide substrate 22 shown in FIG. 7 of the drawings, during oxidation the oxygen reacts with the excess silicon in the tantalum silicide ($TaSi_2$) to form upper silicon dioxide layer 24 with the layer 20' of silicate or mixture tantalum oxide-silicon dioxide being interposed between the silicon dioxide layer 24 and the substrate 22, as illustrated in FIG. 8 of the drawings. If the upper silicon dioxide layer 24 is not needed, it may be removed by employing known etching techniques.

It can be seen that a novel dielectric mixture for a capacitor has been provided which is made by oxidizing a layer of transition metal-silicon alloy having from about 40% to 90% transition metal by atomic volume. The transition metal-silicon alloy is deposited onto an oxidation resistant substrate, which may be made of semiconductor, conductor or insulator material. The alloy is oxidized, preferably in dry oxygen, although wet oxygen may be used, at a temperature which is preferably 400° C. or higher for several minutes or longer until all of the alloy is converted into a silicate or mixture which includes the transition metal oxide and the silicon dioxide. The silicate or mixture preferably has a thickness of 5 to 50 nanometers. The silicate may be patterned by known etchants, e.g., as used with dry or wet etching techniques for patterning silicon dioxide layers. An electrically conductive layer, which may be made of doped polysilicon, a silicide or a metal, is deposited onto the silicate to produce a high dielectric constant-low leakage capacitor.

If desired, the silicate or mixture may be formed from the metal-rich transistion metal silicide by employing known anodizing techniques, although oxidation in dry oxygen is preferred. Furthermore, the homogeneous oxide mixture may also be directly formed during deposition by use of known reactive sputtering or reactive evaporation techniques. To obtain the highest achievable electrical quality, the oxide mixture derived from the above indicated techniques should be subsequently heated within an oxygen atmosphere under the same temperature conditions identified hereinabove.

It has been found that direct insertion of the substrate with the transition metal silicide into an oxidation atmosphere is desired. For densely packed, full sized silicon wafers, it is desired to utilize slow insertion into a furnace so as to achieve uniform conversion. Non-uniformity results from both uneven heating and the rapidity of the conversion reaction. The mechanism is believed to be similar to that observed for the oxidation of porous silicon, i.e., very rapid intergranular penetration of the oxidant followed by diffusion limited radial penetration into the core of the porous metal silicide grain. Transition metal silicides that have been annealed or pre-sintered do not convert readily. For sufficiently thin converted silicides over bare silicon substrates, growth of an interface silicon dioxide occurs as a function of oxidation time. This condition provides stable capacitor-voltage traces with little hysteresis and moderately low interface states. Etching tests with buffered hydrofluoric acid (HF) show that the etch rate of the silicate is approximately one-fifth that of pure silicon dioxide. A desired image defining procedure for storage node applications can use lift off techniques for the evaporated alloy.

Accordingly, a capacitor including a dielectric medium having a high quality index, i.e., high dielectric constant and low current leakage, particularly suitable for use in dense integrated memory circuits, has been provided by employing a simple fabrication process. Furthermore, the dielectric medium may be produced at any stage during the making of semiconductor integrated circuits since the dielectric medium can readily withstand and is stable at high temperatures of more than 1000° C. without destroying the high quality index of the dielectric medium.

While the invention has been particularly shown and described with reference to preferred embodiments thereof, it will be understood by those skilled in the art that various changes in form and details may be made therein wtihout departing from the spirit and scope of the invention.

What is claimed is:

1. A process for making a dielectric material comprising the steps of:
   providing a layer of a transition metal-silicon alloy having from about 40% to 90% transition metal by atomic volume, and
   oxidizing said layer so as to produce a mixture of an oxide of said transition metal and an oxide of said silicon.

2. A process as set forth in claim 1 wherein said mixture is a homogeneous mixture.

3. A process as set forth in claim 2 wherein said layer is oxidized at a temperature of 400° C. or higher.

4. A process as set forth in claim 2 wherein said mixture has a thickness between 5 and 50 nanometers.

5. A process as set forth in claim 2 wherein said alloy layer has a thickness between 4 and 16 nanometers.

6. A process as set forth in claim 2 wherein said alloy layer is oxidized until all of said layer is converted into said mixture.

7. A process as set forth in claim 1 wherein said alloy layer is oxidized in dry oxygen.

8. A process as set forth in claim 1 wherein said transition metal is selected from the group consisting of tantalum, hafnium, zirconium, titanium, lanthanum, yttrium, scandium, niobium and vanadium.

9. A process as set forth in claim 8 wherein said metal is hafnium.

10. A process as set forth in claim 9 wherein said alloy is hafnium silicide HfSi.

11. A process as set forth in claim 8 wherein said metal is tantalum.

12. A process as set forth in claim 11 wherein said alloy is tantalum silicide TaSi.

13. A process as set forth in claim 8 wherein said metal is yttrium.

14. A process as set forth in claim 13 wherein said alloy is yttrium silicide YSi.

15. A process as set forth in claim 8 wherein said alloy is deposited on a substrate.

16. A process as set forth in claim 15 wherein said substrate is an electrically conductive substrate and further including depositing a conductive layer on said mixture.

17. A process for making a dielectric material which includes oxidizing a metal-silicon alloy having a thickness between 4 and 16 nanometers until all of the alloy is converted into oxides, said metal being 40% to 90% of said alloy by atomic volume and being selected from the group consisting of tantalum, hafnium, zirconium, titanium, lanthanum, yttrium, scandium, niobium and vanadium.

18. A capacitor comprising
first and second conductive layers, and
a dielectric layer interposed between said conductive layers, said dielectric layer including a mixture of an oxide of a transition metal and an oxide of silicon.

19. A capacitor as set forth in claim 18 wherein said mixture is a homogenous mixture and said transition metal is selected from the group consisting of tantalum, hafnium, zirconium, titanium, lanthanum, yttrium, scandium, niobium and vanadium.

20. A capacitor as set forth in claim 19 wherein said transition metal oxide is tantalum pentoxide ($Ta_2O_5$).

21. A capacitor as set forth in claim 19 wherein said dielectric layer has a thickness between 5 and 50 nanometers.

22. A capacitor comprising
first and second conductive layers, and
a dielectric layer interposed between said conductive layers, said dielectric layer including a homogeneous mixture of hafnium dioxide ($HfO_2$) and an oxide of silicon.

23. A capacitor comprising
first and second conductive layers, and
a dielectric layer interposed between said conductive layers, said dielectric layer including a homogeneous mixture of yttrium dioxide ($YO_2$) and an oxide of silicon.

24. A capacitor comprising
first and second conductive layers, and
a dielectric layer interposed between said conductive layers, said dielectric layer consisting of a mixture of an oxide of a transition metal and an oxide of silicon.

* * * * *